March 22, 1966 P. S. WILLIAMS 3,241,745
ROTARY GAS COMPRESSION APPARATUS
Filed Jan. 29, 1963 5 Sheets-Sheet 1
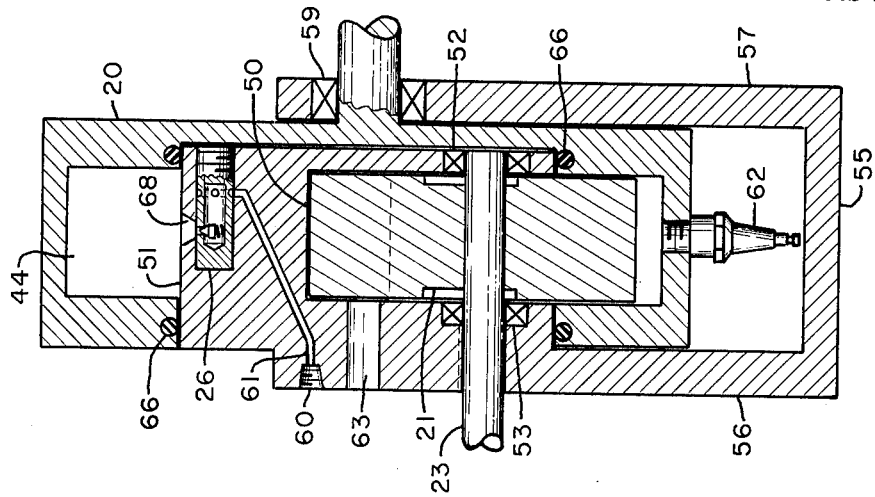
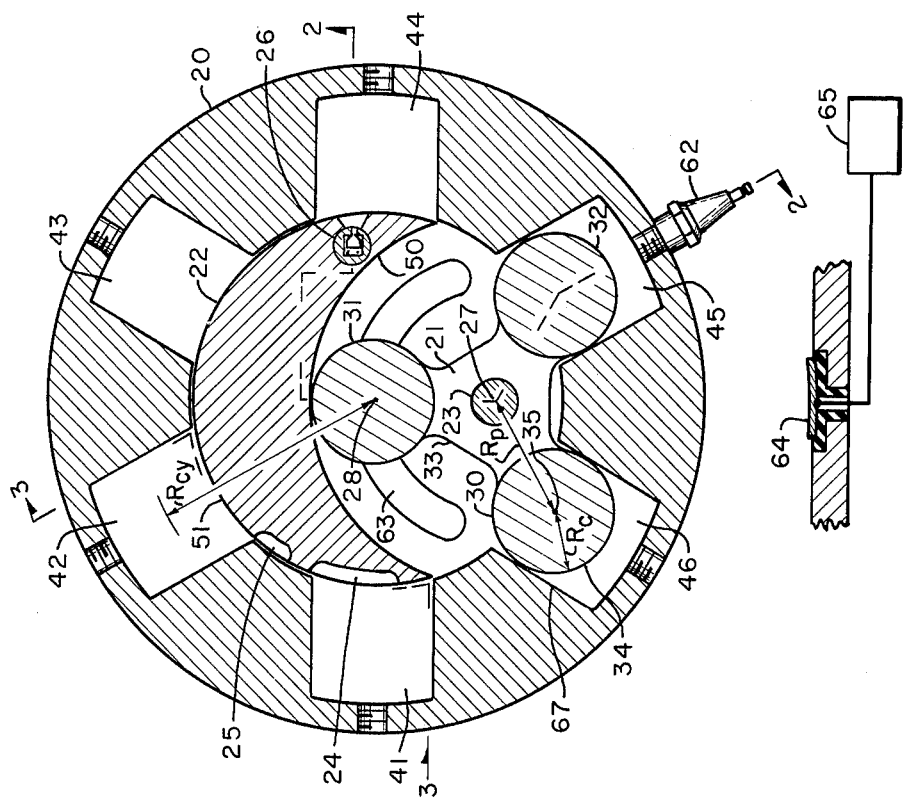
Philip S. Williams INVENTOR.
BY James A. Reily
ATTORNEY March 22, 1966                P. S. WILLIAMS                3,241,745
                    ROTARY GAS COMPRESSION APPARATUS
Filed Jan. 29, 1963                              5 Sheets-Sheet 2
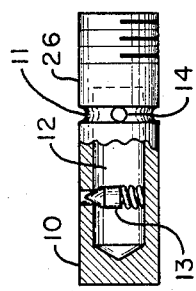
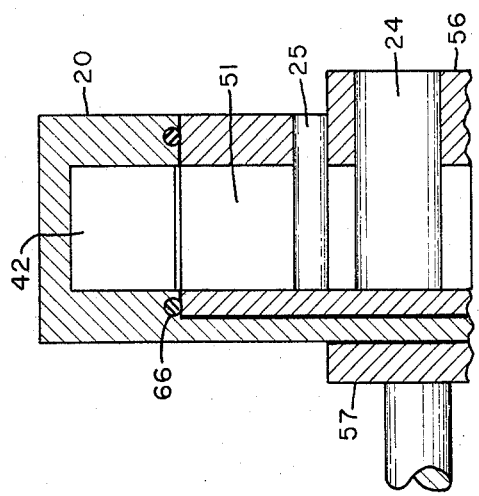
Philip S. Williams INVENTOR.
BY James G. Reilly
ATTORNEY March 22, 1966  P. S. WILLIAMS  3,241,745
ROTARY GAS COMPRESSION APPARATUS
Filed Jan. 29, 1963  5 Sheets-Sheet 4

Philip S. Williams INVENTOR.

BY James A. Reily

ATTORNEY

March 22, 1966  P. S. WILLIAMS  3,241,745
ROTARY GAS COMPRESSION APPARATUS
Filed Jan. 29, 1963  5 Sheets-Sheet 5

Philip S. Williams INVENTOR.

BY *James A. Reilly*
ATTORNEY

United States Patent Office 3,241,745
Patented Mar. 22, 1966

3,241,745
ROTARY GAS COMPRESSION APPARATUS
Philip S. Williams, Tulsa, Okla., assignor, by mesne assignments, to Esso Production Research Company, Houston, Tex., a corporation of Delaware
Filed Jan. 29, 1963, Ser. No. 254,618
4 Claims. (Cl. 230—145)

This invention relates broadly to rotary machines for compressing gases, and more particularly to rotary gas compressors and rotary internal combustion engines.

A number of rotary-type machines have been built or suggested for use as gas compressors and internal combustion engines. In all of these machines, a rotor or piston-like member rotates relative to and within a housing or cylinder-like member. As the former member rotates relative to the latter member, gas is supplied to the engine, is compressed, and is discharged. In those instances where the machine is an internal combustion engine, a suitable fuel is supplied to the apparatus—either sequentially or simultaneously with air. The products of combustion are permitted to expand and are then discharged from the engine. In those instances where the machine is a compressor, the gas is discharged in a compressed condition.

A rotary machine which has recently received public notice is the so-called Wankel engine. This engine consists of a generally triangular rotor which turns eccentrically within a stationary housing especially designed to describe a two-lobe epitrochoid. The three sides of the rotor have a roughly convex curvature; and, together with the inner surface of the housing, they define—in effect—three combustion chambers. Each apex of the rotor is provided with a seal which keeps in contact with the inner surface of the housing. As the rotor turns within the housing, a mixture of fuel and air is introduced within the housing opposite one side of the rotor. As the rotor continues to turn, the fuel-air mixture is compressed between this side of the rotor and the housing. When the desired level of compression has been attained, the mixture is carried past a spark plug which causes it to ignite. Further rotation of the rotor enables the gaseous products of combustion to expand and finally exhaust through a suitable exhaust port or valve.

While the Wankel engine has several interesting performance characteristics, its further development appears to be contingent upon improved solutions to several problems. One of the foremost of these problems is maintaining effective seals within the engine. The point-type contact between the inner wall of the housing and each apex of the rotor is under particular study. Another serious problem is wear—occasioned by the fact that the compression and firing loads within this engine are concentrated along the apexes or edges of the triangular rotor.

It is, accordingly, an object of the present invention to provide a rotary gas compression apparatus or machine which retains the simplicity and compactness of current rotary machines but, at the same time, avoids the wear and sealing problems that characterize such machines. More particularly, it is an object of the invention to provide a rotary compressor or internal combustion engine which provides improved sealing between a piston-like member and a cylinder-like member—at least one of which members rotates relative to the other—without incurring undue wear. It is also a particular object of the invention to provide a two-cycle, rotary, internal combustion engine including a first or piston member comprising one or more pistons, and a second or cylinder member comprising one or more cylinders.

The machine of the present invention comprises three major components—a piston member, a cylinder member, and a connecting member for connecting said piston member with said cylinder member so that the proper motion between each member is achieved. Two of the members must rotate and one must remain stationary, and the angular velocity ratio of the two rotating members relative to the fixed member must be constant. The rotating members, accordingly, are inherently dynamically balanced. The axes of the piston member and the cylinder member are non-coincident.

The piston member comprises one or more pistons which mesh and coact with the cylinder or cylinders of the cylinder member in a manner similar to gears. The ratio of the pitch radius of the cylinder member to the pitch radius of the piston member is 2:1.

Each cylinder of the cylinder member is shaped such that a section taken normal to the axis of the member (i.e., in the plane of rotation of the apparatus) defines straight lines where it intersects the leading and trailing wall surfaces of the cylinder. The straight lines, which are hereinafter sometimes referred to as linear elements of the cylinder, must be symmetrical about the centerline of the cylinder. The linear elements of the cylinder in extending inward from the pitch circle of the cylinder member must fall within a family of lines (all in the same plane as the linear elements themselves) bounded by a first line parallel to the centerline of the cylinder and by a second line passing through the axis of the cylinder member.

The structure of each piston member, in its broadest sense and with reference to a section normal to the axes of rotation of the over-all apparatus, has an arm extending from the axis of the piston member to each piston. The length of each arm may vary from zero up to the effective or pitch radius of the piston member. Each piston of the piston member comprises a transverse element, the two ends of which are the centers of curvature for the piston surface which meshes or pairs with the cylinder. A line joining the two ends of the transverse element is perpendicular to, and is bisected by, the center line of the piston arm. Each such center of curvature, upon relative rotation of the piston and cylinder members, moves in a straight line relative to the latter member and through its axis. In this sense, each center of curvature may be considered as a "tracking point."

The exact configuration of a piston member and its components may vary with different embodiments of the invention. For example, in the case where the radius of curvature of each end of the transverse element is infinitely small, the ends of the transverse element, themselves, mesh with the cylinder wall surfaces. The linear elements of leading and trailing wall surfaces of each cyinder in this case are segments of radial lines passing through the axis of the cylinder member.

In another embodiment of the invention, the transverse element of each piston may have a finite radius of curvature at each end. In this instance, the linear elements of the leading and trailing surfaces of the cylinder member are parallel to lines connecting the corresponding ends of the transverse element with the axis of the cylinder member.

In another embodiment, the length of the transverse element of each piston may be infinitely small. In this case, each piston becomes circular in cross section, and the leading and trailing surfaces of each cylinder are parallel to one another as well as to the center line of the piston arm. The surface of the piston may pair directly with the wall surface of the cylinder. In the case where the pitch radius of the piston rotor is less than one-half the distance between the trailing and leading linear elements of the cylinder, it may pair directly or indirectly with the cylinder. If indirectly, it pairs with an intermediate or associated piston element which, in turn, pairs with the cylinder. The associated piston element rotates relative to the piston and linearly relative to the cylinder.

Torque on either the piston member or the cylinder member from gas pressure within the machine is made substantially zero in accordance with different specific embodiments of the invention. In one embodiment of the invention, as mentioned above, each piston has a circular profile in the plane of rotation, and the linear elements of the leading and trailing surfaces of the cylinder define parallel straight lines in the same such plane. In another embodiment, the linear elements of the leading and trailing surfaces of each cylinder are segments of radii of the cylinder member, and the transverse elements of the piston mesh directly with the surfaces. In the former embodiment, there is zero gas pressure torque on the cylinder rotor. In the latter embodiment, there is zero gas pressure torque on the piston rotor. In versions of the latter embodiment, the linear elements of the leading and trailing surfaces of each cylinder may be displaced slightly from, but should remain parallel to, corresponding radii of the cylinder rotor. Such displacement, while tending to introduce a small gas pressure torque on the piston rotor, may be desirable from the standpoint of improving wear resistance and sealing.

In all instances, the axis of the piston member is eccentric with respect to the axis of the cylinder member. The pitch radius of the cylinder member should be twice the effective radius of the piston member.

In the embodiment of the invention where gas pressure torque on the piston member is zero and the linear elements of the leading and trailing surfaces of the individual cylinders correspond to radial planes passing through the central axis of the cylinder member, the ratio of the pitch radii of the cylinder and piston members should always be 2:1. This same ratio should also be observed whenever there is zero gas pressure torque on the piston member and the linear elements of the leading and trailing surfaces of the individual cylinders are parallel to one another.

It appears that the number of cylinders can theoretically be quite large. From a practical standpoint, however, it is contemplated that no more than about 30, and preferably no more than about 10, should normally be employed.

Torque or load is imparted to, or taken from, the member which is not operating under zero gas pressure torque. Thus, when the piston member is operated at substantially zero gas pressure torque, torque is removed from or imparted to the cylinder member; and vice versa. In either event, the member operating at zero gas pressure torque essentially floats.

The profiles of the pistons and cylinders, as seen in sections taken normal to the axes of rotation, are subject to rigid definition. Thus, in the case where there is zero gas pressure torque on the cylinder member, the equations which describe the path of the point of contact on each cylinder are as follows:

(1) $$y = H$$

(2) $$x = a \cos \theta$$

where "H" is a constant which is numerically one-half the width of the cylinder; "a" is the radius of the pitch circle of the cylinder member; $\theta$ is the angular position of the cylinder member relative to a line joining the axes of the piston and cylinder members; and "x" and "y" are the coordinates of the reference frame which is attached to the cylinder member.

The parametric equations which describe the path of the point of contact on the piston are:

(3) $$x_1 = x \cos (\phi - \theta) - y \sin (\phi - \theta) - d \cos \phi$$

(4) $$y_1 = y \cos (\phi - \theta) + x \sin (\phi - \theta) - d \sin \phi$$

where "d" is the distance between the axes of the piston and cylinder members; $\phi$ is the angular position of the piston member; and $x_1$ and $y_1$ are the coordinates of the reference frame which is attached to the piston member.

Equation 1 simply means that the profile of each cylinder wall in the cylinder member is a straight line. This line is at a distance of "H" from the "x" axis and is parallel to the "x" axis.

Equation 2 means that the "tracking point" moves along this straight line with simple harmonic motion which is relative to the reference frame "xy."

The shape of each piston on the piston member is determinated by substituting Equations 1 and 2 into Equations 3 and 4. The values of $x_1$ and $y_1$ are also related by the same parameter, $\theta$, as "x" and "y" since $\phi$ and $\theta$ are related by a constant.

In view of the above relationships, and also in view of the description hereinafter, several important design features of the present apparatus become manifest. First, as mentioned earlier, the ratio of the effective radius of the cylinder member to the effective radius of the piston member should be 2:1. Second, the maximum length of each cylinder wall is limited by the amount of undercutting necessary in the web of the piston member; viz., the length of the individual cylinders must not produce a cavity within a piston member which would cause failure of the latter member. Third, the cylinders obviously must not be so wide that they overlap. Similarly, they should not be unduly narrow. Fourth, if the effective or pitch radius "a" of the piston member is less than "H," the cylinder walls become continuous.

In the case where there is zero gas pressure torque on the piston member, the following equation defines the cylinder wall with respect to the "xy" reference frame:

(5) $$y = \left(\frac{y_1}{b + x_1}\right) x$$

where "b" is defined as $\sqrt{x_1^2 + y_1^2}$—i.e., the pitch radius of the piston rotor.

The invention may be better understood by reference to the drawings where:

FIGURE 1 is a view in section (in the plane of rotation) of an embodiment of the invention which is contemplated to constitute the best mode of practicing the invention.

FIGURE 2 is a view in section taken along lines 2—2 of FIGURE 1.

FIGURE 3 is a view in section taken along lines 3—3 of FIGURE 1.

FIGURE 4 is an expanded view of the fuel injector 26 shown in FIGURES 1 and 2.

Figure 5:
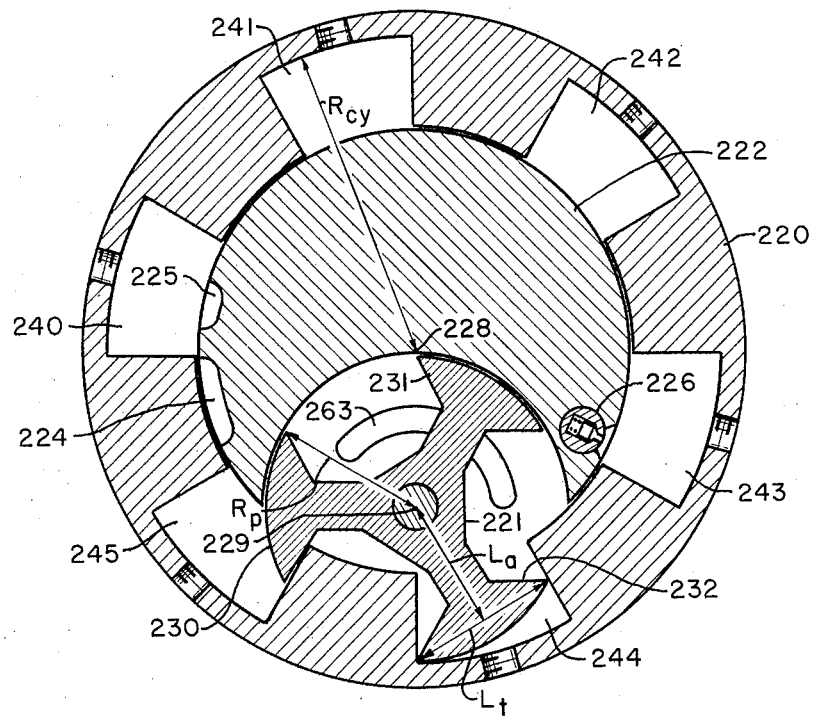
FIGURE 5 is a view in section (in the plane of rotation) of a second form of piston and cylinder members which illustrates a second embodiment of the invention.

Referring to FIGURES 1–4, major components of the embodiment of the invention illustrated there include cylinder member 20, piston member 21, stationary or connecting member 22, piston shaft 23, exhaust port 24, intake port 25, and fuel injector 26. Both piston member 21 and cylinder member 20 will be considered as rotors in this embodiment. The axis of rotation of the piston rotor is indicated by the legend 27, and the axis of rotation of the cylinder rotor is indicated by the legend 28. The embodiment of the invention shown here is the one referred to earlier, wherein the ratio of the pitch radii of the cylinder and piston members is 2:1 and there is zero gas pressure torque on the cylinder rotor.

Piston rotor 21 comprises three pistons 30, 31 and 32 connected together by a suitable web 33 having a separate arm for each piston. The piston rotor is secured to shaft 23 and is rotatable in a clockwise direction about its axis 27. The profile of each piston defines a circle. Referring to piston 30, for example, lateral edge or boundary 34 of the piston defines a circle having a radius of curvature $R_c$ about the center point 35. The effective radius of the piston member is designated by the legend $R_p$, and the effective radius of the cylinder member by the legend $R_{cy}$.

Cylinder rotor 20 comprises six cylinders 41 through 46 spaced equally about the rotor. The leading and trailing linear elements of each cylinder are straight and parallel. The effective or pitch radius of the cylinder rotor is twice the effective or pitch radius of the piston rotor.

The thickness of each cylinder head is selected and designed according to the strength that this portion of the cylinder rotor must possess. The length of each cylinder is selected to avoid interference with the rotating piston rotor—e.g., the web 33.

Stationary member 22 helps separate individual cylinders of the cylinder rotor. It contains ports 24 and 25 for the flow of fluids to and from the cylinders. It also contains a fuel injector assembly 26 for supplying fuel to the individual cylinders. For the purposes of the present invention, it forms the third or connecting member or link of the apparatus of the invention.

The inner surface 50 of stationary member 22 must clear the pistons of the piston rotor 21. It may therefore be defined as the arc of a circle drawn about the axis 27 of the piston rotor. The outer surface 51, on the other hand, must clear the cylinder rotor 20; it may therefore be defined as the arc of a circle drawn about the cylinder rotor axis 28. Neither of the surfaces 50 or 51 is required to take any load and therefore need not serve as a bearing. However, clearances between these surfaces and the piston and cylinder rotors, respectively, should be kept small.

Shaft 23 is conveniently supported by bearings 52 and 53 within the stationary connecting member 22 and within support member 57, respectively. Stationary connecting member 22, it will be recognized, is supported from base member 55 by support member 56. The cylinder rotor may be rotatably mounted as by means of bearing 59. Bearing 59 is also supported from base member 55 by support member 57.

Certain additional components other than those described above have been illustrated schematically in FIGURES 1–3 for the purpose of showing how the engine embodiment of those figures may be supported, manifolded, etc. Such components include fuel connection 60, fuel conduit 61, spark plug 62, breather port 63, slipper plate 64, and timed high voltage source 65. Ring-type seals or the like may be used to effect seals 66 between stationary member 22 and the inner surface of cylinder rotor 20, as desired.

Cylinder rotor 20 rotates about connecting member 22. Connecting member 22, as noted earlier, is supported from base member 55 by means of a suitable support member 56. An exhaust manifold, not shown but communicating with exhaust port 24, may be supported from base 55. An intake manifold, also not shown, may communicate with intake port 25, and it may be supported from base 55 in a manner similar to the exhaust manifold. Air to the intake port 25 is preferably supplied by means of a suitable blower, supercharger or the like, not shown.

In operation, cylinder rotor 20 rotates about its axis 28 in a clockwise direction. Simultaneously, piston rotor 21 rotates in a clockwise direction about its axis 27. The axis of the piston rotor is eccentric relative to the axis of the cylinder rotor. Member 22 remains stationary, along with base member 55 and support members 56 and 57.

Referring specifically to cylinder 46, and assuming the apparatus to be in motion, it may be further assumed that combustion of fuel and air has occurred in this cylinder, and that expansion of the hot gases is in progress. Expansion of the gases will continue until the cylinder rotor and the piston rotor have both rotated to the point where the piston 30 withdraws from cylinder 46. At virtually this same point, leading linear element 67 will move over port 24, and gases from cylinder 46 will discharge through the port. Any gases tending to exhaust from cylinder 46 into the volumetric region within which the web 33 turns will vent through breather port 63.

As the cylinder rotor continues to rotate, linear element 67 of cylinder 46 will next engage port 25, whereupon fresh air will enter the cylinder and flush any remaining spent gases of combustion through exhaust port 24. As indicated previously, a supercharger is preferably used to supply air to the individual cylinders, thus insuring complete scavenging of the cylinders.

As cylinder rotor 20 continues to rotate, cylinder 46 is cut off from ports 24 and 25 in that sequence. Shortly after linear element 67 of cylinder 46 passes the fuel injection system 26, fuel enters the cylinder from a suitable timed fuel pump, not shown. The fuel passes through connection 60 and conduit 61 and ultimately discharges through fuel injector 26 and port 68 into the cylinder. Fuel injector 26, as shown in FIGURE 4, includes body member 10 threaded at one end for insertion into stationary member 22, annular groove 11, port 14, central passageway 12, and spring-loaded valve 13. Fuel supplied from the fuel pump flows into port 14 from annulus 11 and then into passageway 12. The fuel pressure causes the valve 13 to open momentarily, and the fuel discharges into the engine cylinder.

Immediately after fuel injection has occurred, cylinder 46 passes away from surface 51 of stationary connecting member 22, and piston 30 again enters the cylinder and begins to compress the fuel and air mixture therein. Compression continues until piston 30 reaches its top dead center within the cylinder. At or near top dead center, spark plug 62 is energized by high voltage source 65 through electrically conductive slipper plate 64 and the tip of spark plug 62. A separate spark plug is provided for each cylinder and is mounted in the ports illustrated for the various cylinders in FIGURE 1.

While the engine operation just described has been directed primarily toward a 2-cycle engine using spark ignition, it will be apparent that engines may be also operated according to a diesel-type cycle. This may be conveniently done by placing fuel injectors in the positions now shown to be occupied by spark plugs. Fuel may be injected into the individual cylinders after the desired degree of air compression has occurred.

Power generated by the engine may be withdrawn as by means of shaft 23. The power may be used to drive a generator, motor, gear train, hydraulic turbine, or the like.

As indicated above, engines of the type shown in FIGURES 1–4 may be operated on either the diesel- or Otto-type cycle. Further, the fuel may be gasoline, diesel fuel, kerosene, or any other suitable type of fuel compatible with the type of cycle employed.

To facilitate cooling, cylinder rotor 20 may be constructed of aluminum and may be provided with fins to permit air cooling. In addition, water or gas may be circulated through ports and channels, not shown, within the stationary member 22. The engine may be lubricated according to conventional procedures. For example, a lubricating oil may be incorporated within the fuel.

FIGURE 5 illustrates an embodiment of the invention wherein zero gas pressure torque exists on the piston rotor rather than the cylinder rotor. The engine shown in FIGURE 5 comprises the same major components as the engine shown in FIGURES 1–3 with two major differences. The first differences lies in the shape of the pistons 230 through 232, inclusive. The second difference lies in the profile of the cylinders 240 through 245, inclusive. Linear elements of leading and trailing surfaces of these cylinders, instead of being parallel to one another as shown in FIGURE 1, are portions of radii of the cylinder rotor.

The pitch radii of the piston and cylinder members in FIGURE 5 are again designated by the legends $R_p$ and $R_{cy}$, respectively. The length of the transverse element of the piston is designated by $L_T$ and the length of the piston arm by $L_A$.

The individual pistons 230–232 are not circular in cross section as are the pistons 30–32 in FIGURE 1. Instead, they are ansate in character in that they have a cross-like shape. The crown of each cylinder may have a profile which is an arc of a circle drawn about the center of rotation 27 of piston rotor 21. However, the piston crown profiles and the inner surfaces of the cylinder heads may be modified as desired.

As in the case of the embodiment shown in FIGURES 1–3, the embodiment shown in FIGURE 5 employs a cylinder pitch radius/piston pitch radius of 2:1. Similarly, the piston member 221 and the cylinder member 220 rotate while the central member 222 remain stationary.

An exhaust port 224, an intake port 225 and a fuel-injection assembly 226 may be provided in the embodiment shown in FIGURE 5, similarly as shown in FIGURE 1. Breather port 263 may be used to vent the area within which the pistons 230–232 rotate when not in engagement with the cylinder rotor.

A detailed description of the structure and operation of the embodiment shown in FIGURE 5 is not included here, since such description—except for the features just noted—would be essentially identical with the description of the embodiment shown in FIGURES 1–3. Any torque applied to the apparatus, or any load withdrawn from the apparatus, of course, is transmitted through the cylinder rotor rather than the piston rotor.

Figure 6:
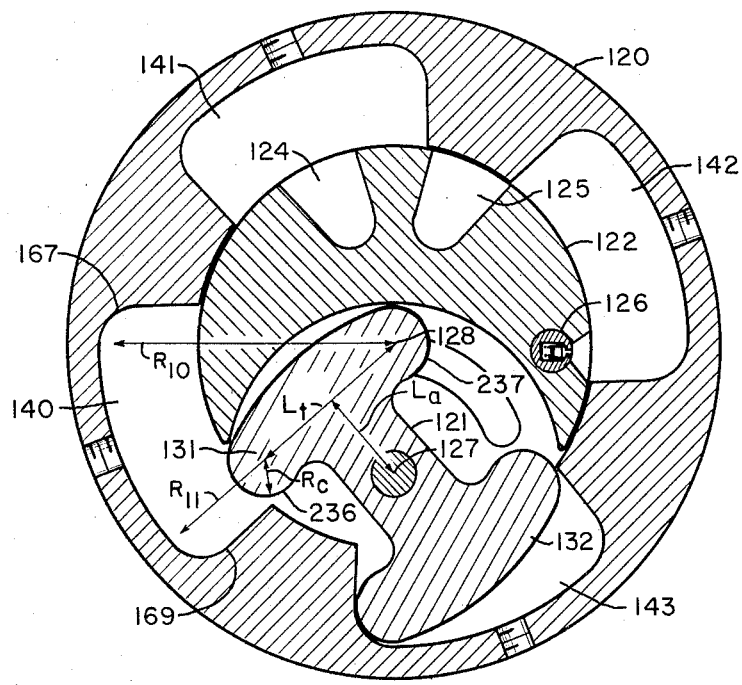
FIGURE 6 is a view in section (in the plane of rotation) of a third form of piston and cylinder members which illustrates a third embodiment of the invention.

The apparatus shown in FIGURE 6 is essentially a variation of the embodiment shown in FIGURE 5. There exist two significant differences. The first difference lies in the fact that the linear elements of the leading and trailing wall surfaces of the cylinders are not in themselves radii of the cylinder rotor but instead are parallel to such radii. The leading edge 167 of cylinder 140, for example, is parallel to radius $R_{10}$ extending through the axis of rotation 128 of the cylinder rotor 120. Similarly, the trailing edge 169 is parallel to but is displaced from the radius $R_{11}$ which also extends through point 28.

The second major difference lies in the shape of the pistons 131 and 132 of the piston rotor 121. In this instance, the pistons terminate in rounded end portions 236 and 237 rather then relatively sharp edges as in the case of FIGURE 5. The radius of curvature of each end portion corresponds in length to the displacement of the linear elements of the walls of the cylinders from the radii of the cylinder rotor with which they are parallel. Thus, the radius of curvature $R_c$ for end portion 236 is substantially equal to the lateral distance between trailing edge 169 and radius $R_{11}$.

Other components shown in FIGURE 6 include exhaust port 124, intake port 125, fuel injection assembly 126 and stationary member 122.

As in the case of the engine shown in FIGURE 5, torque is preferably transmitted through the piston rotor of the embodiment shown in FIGURE 6, rather than the cylinder rotor. A somewhat greater amount of gas pressure torque will be exerted on the cylinder rotor 120 than on the corresponding cylinded rotor 220 of FIGURE 5. However, the degree of such torque will remain small so long as the cylinder pitch radius/piston pitch radius ratios remain close to 2:1. The piston profile of the piston rotor 121 should effect sealing somewhat superior to the piston profile shown in FIGURE 5.

Figure 8:
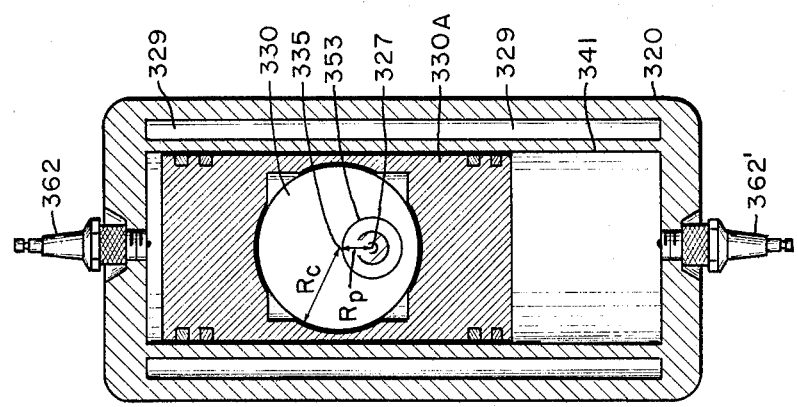
FIGURE 8 is a view in section (in the plane of rotation) of a piston as taken along the lines 8—8 of FIGURE 7.
Figure 7:
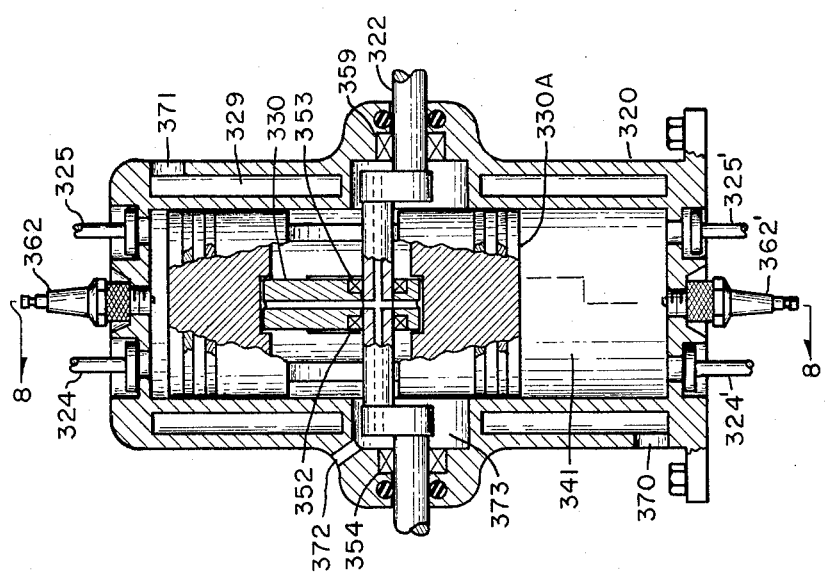
FIGURE 7 shows, in section, still another combination of piston and cylinder members which forms a fourth embodiment of the invention.

FIGURES 7 and 8 illustrate an embodiment of the invention which basically resembles the embodiment shown in FIGURES 1–3. Linear elements of leading and trailing surfaces of cylinder 341 (which may be circular in lateral cross section) are parallel straight lines. The member in this instance which corresponds to the piston members in FIGURES 1–3 comprises circular piston 330 supplemented by element 330A. Element 330A is, in effect, a sealing means for piston 330. In another light, it is a link member which pairs on the one hand with the piston 330 and on the other hand with the cylinder wall surface. It serves essentially as a piston itself within the cylinder.

Piston 330 rotates on bearings 352 and 353 about crank 322; it also rotates in contact with and relative to element 330A which reciprocates within cylinder 341. Crank 322 is a connecting member corresponding to member 22 in FIGURES 1–3. In this instance, however, crank 322 is rotatory rather than stationary and cylinder member 320 is stationary rather than rotatory. Crank 322 rotates on bearings 354 and 359.

As piston 330 in FIGURES 7 and 8 rotates and is driven downward by an explosion caused by spark plug 362, crank 354 also rotates. Intake valve 324 and exhaust valve 325 are both shut at the start of the power stroke. However, valve 325 opens generally before the downward movement of the piston is completed, and exhaust of combustion products then occurs. Intake valve 324 opens shortly thereafter, and fresh air (preferably from a supercharger or the like) enters the cylinder through this valve and scavenges the upper end of cylinder 341 through exhaust valve 325.

As the piston 330 with associated element 330A moves upward within cylinder 341, exhaust valve 325 closes, followed by intake valve 324. Fuel may be injected along with the fresh air charge, or it may be injected separately if desired, as by means of a timed injector, not shown. At or near the top of the compression stroke, ignition of the fuel-air mixture is caused by a timed spark from spark plug 362. In the case of a diesel engine, ignition may be caused by a hot plug or simply as a result of thermal effects. In any event, the cycle then repeats. Further, the same type of cycle occurs in the opposite end of the cylinder member where valves 324' and 325' and spark plug 362', respectively, serve the same functions as valves 324 and 325 and spark plug 362.

Water is circulated through jacket 329 to cool the engine in FIGURES 7 and 8. Conveniently, water may enter the jacket through inlet port 370 and leave through outlet port 371. Lubricating oil may be supplied to the engine through port 372 to maintain a level of oil in sump 373. Splash-type lubrication takes place when crank 322 rotates.

Figure 9:
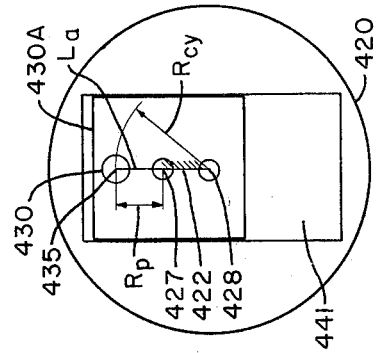
FIGURE 9 illustrates in schematic form (in the plane of rotation) another embodiment of the invention. This embodiment is similar to the embodiment of FIGURE 8, but the cylinder member and piston member rotate and the connecting member is stationary.

As noted earlier, the embodiment of the invention shown in FIGURE 9 is a schematic representation of an apparatus which genedally resembles the apparatus shown in FIGURES 7 and 8. However, the cylinder member 420 and the piston member 430 rotate, and the connecting member 422 remains stationary. Piston member 430 in this instance defines a circle whose radius of curvature is centered at point 435 which, again, is "tracking point." The axis 427 of the piston rotor is eccentric relative to the axis 428 of the cylinder member. Piston member, in this instance, comprises circular member 430 as well as sealing means or element 430A. Since the pitch radius $R_p$ of the piston member is less than one-half the distance between the leading and trailing linear elements of the cylinder 441, the linear elements become continuous in that the piston member reciprocates within a single cylinder of the cylinder member. The piston rotor axis 427 is eccentric relative to the cylinder axis 428, $R_p$ is equal to one-half the $R_{cy}$, and the connecting member is represented by legend 422.

Numerous modifications obvious to persons skilled in the art may be made in embodiments illustrated in FIGURES 1–8 without departing from the spirit and scope of this invention. For example, the engines shown in FIGURES 7 and 8 may be readily adapted to gas compression apparatus by eliminating the spark plugs and fuel supply devices, and by replacing the exhaust valves with back pressure valves set to release compressed gas from the cylinders of the cylinder members at preselected pressures. Similar transitions may be made in the apparatus shown in FIGURES 1–6 by substituting back pressure valves for the spark plugs.

The engines of FIGURES 7 and 8 may be readily converted to single-acting engines. Intake and/or exhaust ports may also be provided in the cylinder walls in place of the intake and exhaust valves. In the case of a single-acting engine, for example, exhaust ports may be positioned such that they are uncovered by a piston as the piston travels downward in response to the expansion of a burning charge of fuel. Scavenging and re-charging of the cylinders with air may be realized by means of intake valves mounted in the cylinder heads. The intake valves would normally be timed to close after the exhaust ports have been re-covered by the piston.

Gears may be used in conjunction with the rotating component members of the present invention. Referring to the embodiment of FIGURES 1–3, for example, the piston rotor shaft and the cylinder rotor shaft may be geared to one another by means of gears not shown. The gear train, of course, should enable the cylinder rotor to rotate at one-half the speed of the piston rotor—i.e., in the same ratio as the angular velocities of these members. Such gearing would help to minimize possible wear between each piston and its cylinder by keeping these members at optimum clearances during operation.

The embodiments of this invention may be operated over a wide range of speeds. It is contemplated, however, that they best operate at speeds intermediate the speeds of reciprocating gas compression apparatus or internal combustion engines and the speeds of turbines. At relatively high speed, any gas blow-by and sealing problems are minimized.

What is claimed is:

1. An improved rotary gas compression apparatus including a cylinder member having at least one cylinder, a piston member having at least one piston, and a link member interconnecting said piston member and said cylinder member so as to enable two of said three members to rotate and the third member to remain stationary, the axes of said members being parallel to one another and normal to the plane of rotation, said piston member having its axis spaced from the axis of said cylinder member and having an effective radius about ½ the effective radius of said cylinder member, each cylinder of said cylinder member having a leading surface and a trailing surface, each piston of said piston member and each cylinder of said cylinder member being profiled to provide a constant angular velocity between such members, an arm connecting each piston with the axis of said piston member, each piston comprising in cross-section in the plane of rotation a transverse element with two opposite curved ends defining the boundary surface portions of the piston, each curved end being defined by rotation of a radius of curvature about a center of curvature, the two centers of curvature for each piston being joined by a line of finite length which is perpendicular to and bisected by the center line of the piston arm, said leading surface and said trailing surface of each said cylinder defining in cross-section in the plane of rotation linear elements which are symmetrical about the center line of said cylinder and tangential to the mating boundary surface portions of each piston of said piston member which enters said cylinder, each said linear element extending inward of said cylinder member in an area bounded on one side by the axis of said cylinder member and on the other side by a line parallel to the center line of its respective cylinder, gas intake means operative to supply each said cylinder wth gas prior to a compression stroke of a piston therein, and gas exhaust means operative to release the gas from each said cylinder following a compression stroke.

2. An apparatus as defined in claim 1 in which the leading and trailing linear elements of each cylinder are parallel to radii of said cylinder member but spaced therefrom.

3. An apparatus as defined in claim 1 in which the two rotatable members are said piston member and said cylinder member and including gear means for transmitting angular movement between said members such that the angular movements of said members is in the same ratio as their effective radii.

4. An apparatus as defined in claim 1 including fuel supply means operative to supply fuel to each said cylinder.

References Cited by the Examiner

UNITED STATES PATENTS

| 726,896 | 5/1903 | Franzen | 91—68 |
| 1,166,999 | 1/1916 | Loftus | 123—12 |
| 2,336,479 | 12/1943 | Graef | 103—126 |
| 2,979,036 | 4/1961 | Noren | 91—68 |

FOREIGN PATENTS

| 900,028 | 12/1951 | Germany. |
| 18,551 | 1901 | Great Britain. |

SAMUEL LEVINE, *Primary Examiner.*

LAURENCE V. EFNER, DONLEY J. STOCKING,
*Examiners.*

M. PETRY, J. C. MUNRO, W. L. FREEH,
*Assistant Examiners.*